United States Patent [19]

Tojima et al.

[11] Patent Number: 4,565,273

[45] Date of Patent: Jan. 21, 1986

[54] DAMPER DISK HAVING HYDRAULIC SHOCK ABSORBERS

[75] Inventors: Hiromi Tojima; Kouji Kajitani, both of Hirakata, Japan

[73] Assignee: Kabushiki Kaisha Daikin Seisakusho, Neyagawa, Japan

[21] Appl. No.: 413,251

[22] Filed: Aug. 31, 1982

[51] Int. Cl.[4] ........................... F16D 3/66; F16D 3/80

[52] U.S. Cl. .............................. 192/106.2; 192/70.17; 192/106.1; 192/109 D; 464/27; 464/68

[58] Field of Search ............... 192/106.2, 106.1, 70.17, 192/109 D; 464/27, 24, 26, 64, 68

[56] References Cited

U.S. PATENT DOCUMENTS

| | | | |
|---|---|---|---|
| 1,352,251 | 9/1920 | Dickinson et al. | 464/27 |
| 2,284,349 | 5/1942 | Thelander | 192/106.2 X |
| 2,316,820 | 4/1943 | Thelander | 192/106.2 |
| 2,337,134 | 12/1943 | Thelander | 192/106.2 |
| 2,513,379 | 7/1950 | Thelander | 464/27 X |
| 2,520,180 | 8/1950 | Thelander | 464/27 X |
| 2,569,503 | 10/1951 | Thelander | 464/27 X |
| 4,148,200 | 4/1979 | Scallhorn et al. | 192/106.1 X |
| 4,351,167 | 9/1982 | Hanke et al. | 192/106.2 X |

FOREIGN PATENT DOCUMENTS

| | | | |
|---|---|---|---|
| 0131851 | 10/1981 | Japan | 192/106.2 |
| 0156526 | 12/1981 | Japan | 192/106.1 |

*Primary Examiner*—Rodney H. Bonck
*Attorney, Agent, or Firm*—Armstrong, Nikaido, Marmelstein & Kubovcik

[57] ABSTRACT

The invention discloses a damper disc comprising a spline hub; a radial flange formed at the hub; a sealed case covering the flange and having a radially outer portion to which a torque is transmitted; torsion springs disposed in openings in the flange and axially faced hollows in the case for connecting the flange and the case together; and a piston cylinder mechanism arranged in the case and having a piston operable to move in accordance with relative torsion between the case and the flange, the case and a cylinder of the piston cylinder mechanism being filled with operating oil, and the cylinder being provided with a narrow space through which the oil can be discharged.

5 Claims, 7 Drawing Figures

8
5a
5
7
6
16
17
18
15
3
4
21
22
48
49
49
2
35
35
31
23
24
11
12
13
13
III
1
38
36
37
48
32
38
49
49
46
2
43
41
42
45
40
7
8
9

16
49
4
48
3
49
2
25
26
23
24
1
33
34
30
30
34
24
23
49
48
33
43
56
56
55

DAMPER DISK HAVING HYDRAULIC SHOCK ABSORBERS

BACKGROUND OF THE INVENTION

The present invention relates to a damper disc in which a shock absorber of hydraulic type is arranged so as to effectively absorb a torsional vibration for improving a starting feeling of a vehicle.

Generally, a clutch disc of an automobile has been provided with a damper disc of frictional type including friction washers. However, such damper generates a fixed torque hysteresis independently of a relative torsion speed between a driving side and a driven side. Therefore, when damping characteristics are determined so as to achieve a good starting feeling, torsional vibration in high speed driving can not effectively be absorbed.

Accordingly, it is an object of the invention to provide an improved damper disc, overcoming the above-noted disadvantages, in which a shock absorber of hydraulic type is arranged.

Other and further objects, features and advantages of the invention will appear more fully from the following description of the preferred embodiments of the invention.

DETAILED DESCRIPTION OF THE PREFERRED EMBODIMENTS

Figure 1:
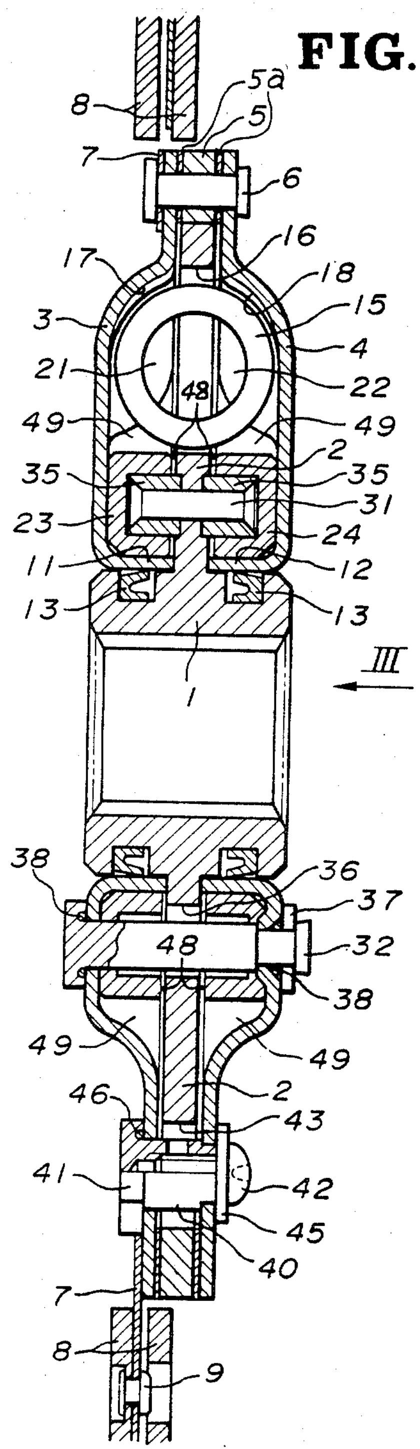
FIG. 1 is a sectional partial view of a clutch disc of an embodiment according to the invention.

Referring to FIG. 1, a spline hub 1 is splined to an output shaft (not shown) and has a radial flange 2, of which both sides are covered by a pair of cases 3 and 4. The cases 3 and 4 have larger diameters than the flange 2. Radially outer portions of the cases 3 and 4 are connected together by pins 6 with an annular member 5 and annular packings 5*a* therebetween. The pins 6 also fix cushioning plates 7 to the case 3. A pair of annular friction facings 8 are fixed to the plates 7 by rivets 9. Inner peripheral portion of the cases 3 and 4 are formed into cylindrical flanges 11 and 12 which extend toward the flange 2 and are in contact with seals 13 fitted in annular grooves on the outer peripheral surface of the hub 1. A space in the cases 3 and 4 is filled with operating oil.

Figure 3:
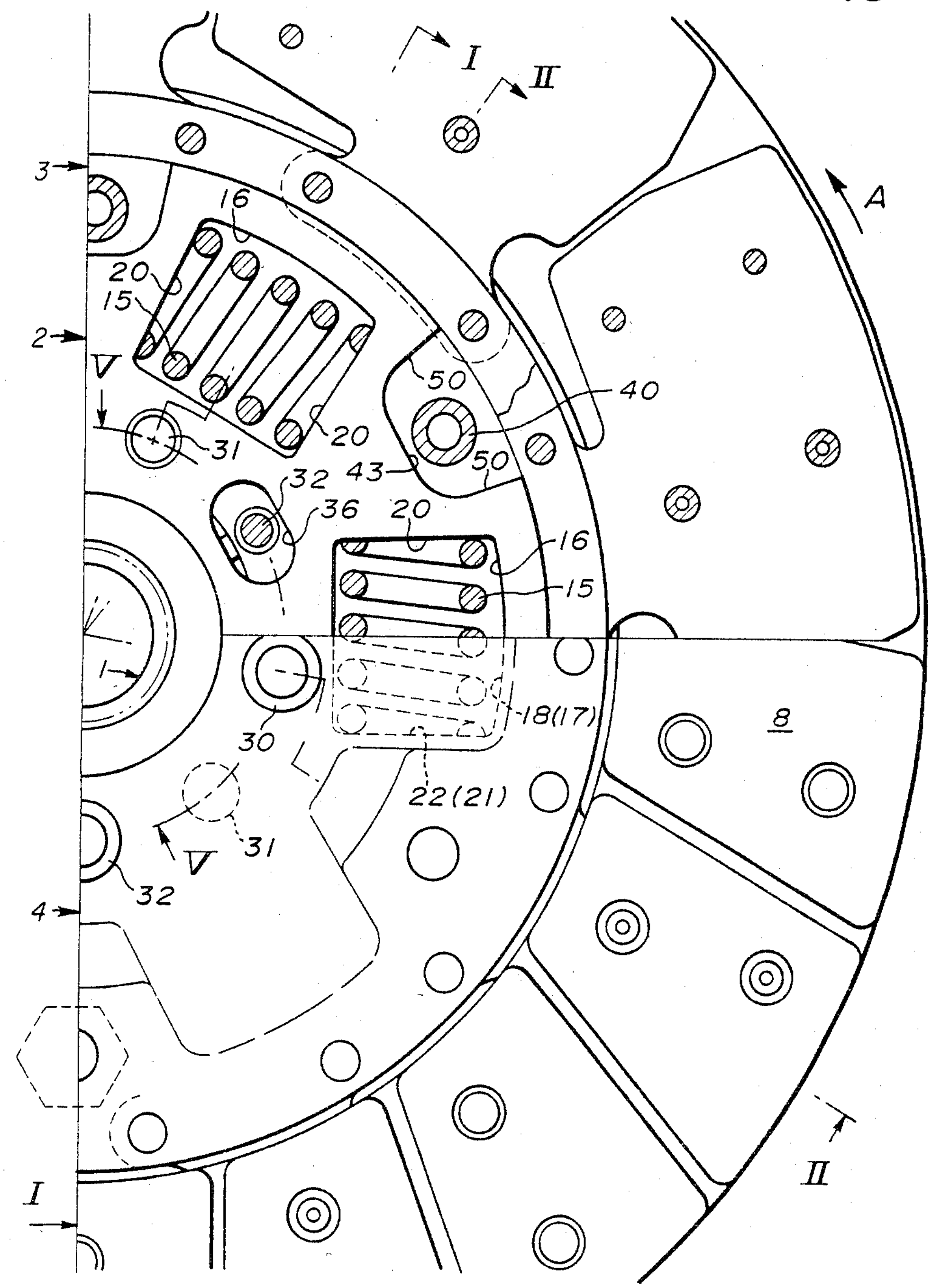
FIG. 3 is a partially cut-away view of a clutch disc viewed in a direction of an arrow III of FIG. 1.

As shown in FIG. 3, six compressible coil springs 15 (torsion springs) which extend circumferentially with respect to the disc are arranged in six openings 16, respectively. The openings 16 are formed in the flange 2 and are circumferentially and equally spaced to each other. As shown in FIG. 1, side portions of each spring 15 protruding from the opening 16 are positioned in hollows 17 and 18 formed in the cases 3 and 4. When the cases 3 and 4 are not twisted or torsionally turned with respect to the flange 2 as shown in FIG. 3, both ends of each spring 15 contact with side edges 20 of the opening 16 in the flange 2 and inner end surfaces 21 and 22 of the hollows 17 and 18.

Figure 2:
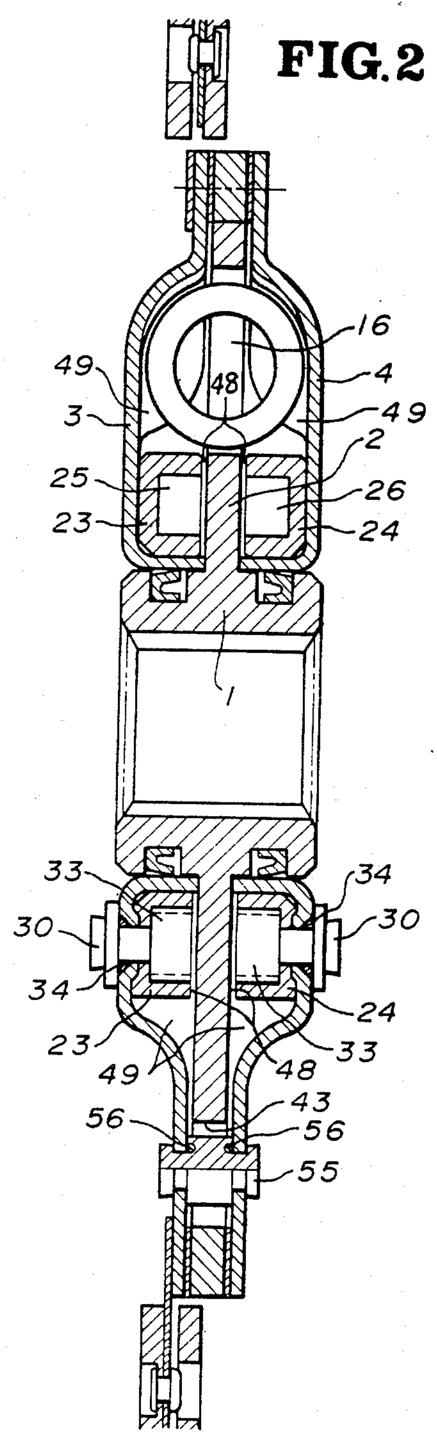
FIG. 2 is an other sectional partial view of a clutch disc of FIG. 1.

Referring to FIG. 2, annular cylinders 23 and 24 are arranged between an inner portion radially inside the openings 16 of the flange 2 and inner portions of the cases 3 and 4. The cylinders 23 and 24 are slidable on the flange 2 and respectively have annular chambers 25 and 26 which are opened toward each other and closed by the flange 2. As shown in FIG. 3, three kinds of pins 30, 31 and 32 and alternatively arranged at nine portions in the inner portion of the clutch disc with circumferential spaces therebetween. As shown in FIG. 2, the pins 30, which are partitions, are paired, and are used to fix the cylinders 23 and 24 to the cases 3 and 4, respectively. The pins 30 have large diameter portions which are closely fitted to the inner surface of the cylinders 23 and 24 and partition the cylinder chamber 25 and 26 into partially annular chambers. Annular seals 34 are disposed around the pins 30. Portion 33 is a large diameter portion of pin 30. As shown in FIG. 1, the pins 31 fix cylindrical pistons 35 to both side surfaces of the flange 2. The pistons 35 are slidable on the inner surfaces of the cylinders 23 and 24. The pins 32 are fitted into apertures in the cases 3 and 4 and the cylinders 23 and 24 to fix the cases 3 and 4 together, and are pressed through circumferentially long apertures 36 (see FIG. 3) in the flange 2. As shown in FIG. 1, washers 37 and annular seals 38 are arranged around the pins 32. Radially outer portions of the cases 3 and 4 are connected together by stopper pins 40 assembled of pins 41 of large diameter and pins 42 of small diameter. The pins 41 are fitted into apertures in the cases 3 and 4. The pins 42, which are screws, are screwed into screw holes in the pins 41. The pin 40 is passed through recesses 43 formed in outer peripheral portions of the flange 2. Washers 45 also functioning as seals are arranged between the case 4 and the heads of the pins 42. Annular seals 46 are arranged around the pins 41. The stopper pins 40 may be modified as pins 55 in FIG. 2, which are formed by rivets connecting the cases 3 and 4 together. Annular seals 56 are arranged around the pins 55.

One of the specific functions or operation of the disc can be as follows. When the clutch is engaged to transmit a torque in the clutch rotation direction A in FIG. 3 from a flywheel (not shown) to the facings 8, the torque is transmitted to the cases 3 and 4 through the cushioning plates 7, and then transmitted from the inner end surfaces 21 and 22 of the hollows 17 and 18 through the springs 15 to the side edges 20 of the openings 16, and further transmitted through the flange 2 and the hub 1 to the output shaft. In this operation, the springs 15 through which the torque is transmitted are compressed, so that the cases 3 and 4 are twisted or torsionally turned with respect to the flange 2 and, as shown at a characteristic X in FIG. 4, torsion angle D and torque transmitted only through the springs 15 proportionally increase.

Figure 4:
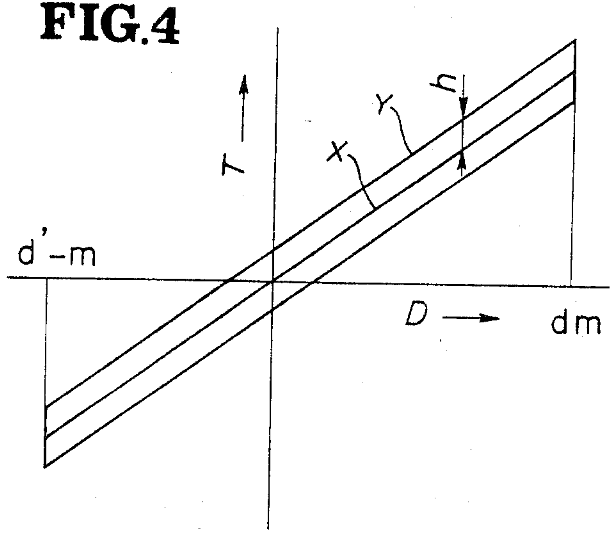
FIG. 4 is a graph explaining characteristics between transmitted torque and torsion angle.
Figure 5:
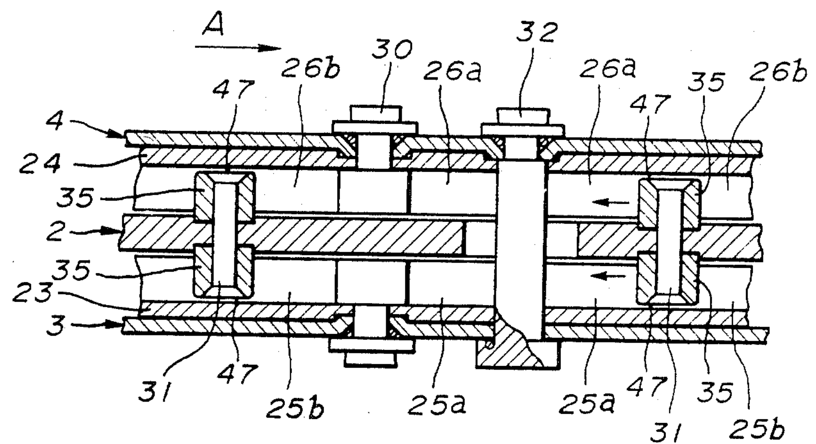
FIG. 5 is a sectional view taken along line V—V of FIG. 3.

Referring to FIG. 5, when the cases 3 and 4 torsionally turn with respect to the flange 2 in the rotation direction A as stated above, the pistons 35 move relatively reversely to the rotation direction A (leftward in FIG. 5) in the cylinders 23 and 24, so that the operating oil is compressed in the cylinder chambers 25*a* and 26*a* between the piston 35 and the pins 30 (partition). Some of the compressed oil is discharged through narrow spaces 47 between the pistons 35 and the cylinders 23 and 24 into the cylinder chamber 25*b* and 26*b* behind (right to) the pistons 35. Some of the compressed oil is discharged through narrow spaces 48 (FIGS. 1 and 2) between the flange 2 and the cylinders 23 and 24 into a chamber 49 radially outside the cylinders 23 and 24. The compressed oil flowing through the narrow spaces 47 and 48 applies resistance to the pistons 35 and pins 30. Thus, a torque corresponding to the oil resistance is transmitted from the pins 30 on the cases 3 and 4 through the oil and pistons 35 to the flange 2. Thus, as shown in FIG. 4, a hysteresis h is added to the characteristic X, which forms an actual torque characteristic Y. The illustrated characteristic Y is acquired when the torsional angular speed or torsionally turning speed is fixed. When the torsional angular speed changes and the relative moving speed of the pistons 35 changes, a flowing speed of the oil from the chambers 25*a* and 26*a* also changes, so that the resistance by the oil against the pins 30 and the pistons 35 changes. Thus, the hysteresis h changes in accordance with the change of the torsional angular speed.

When the torsion angle D reaches a maximum value of dm (d′-m), the stopper pins 40 contact with the side edges 50 of the recesses 43 in the flange 2, so that more torsion is prevented.

According to the invention, as stated hereinbefore, the disc includes the hydraulic shock absorber, in which the hysteresis torque changes in accordance with the change of the torsional angular speed. Therefore, torque vibrations both in the high speed driving and the starting and stopping operation can effectively be absorbed. The oil can easily be exchanged for oil having other viscosity so as to change the hysteresis characteristic for constructing the damper discs respectively suitable for various uses.

In a modification of the invention, cylinders opened toward the cases 3 and 4 may be employed instead of the illustrated cylinders 23 and 24. In this modification, the cylinders and partitions are fixed to the flange 2, and the pistons are fixed to the cases 3 and 4. The invention may be applied to a disc in which torsion springs are operable at two or more steps.

Figure 7:
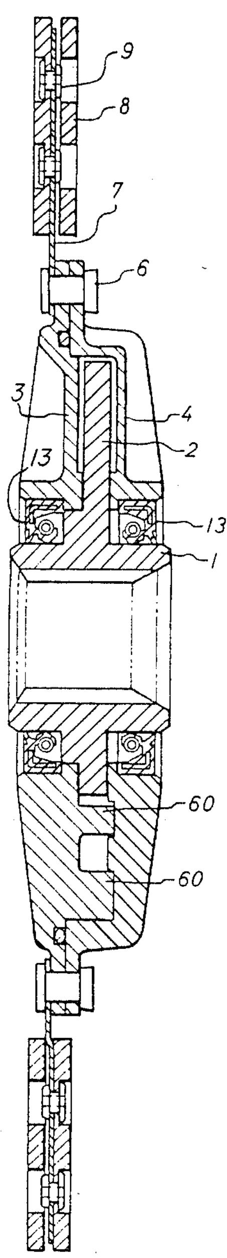
FIG. 7 is a sectional view of a damper disc of FIG. 6.
Figure 6:
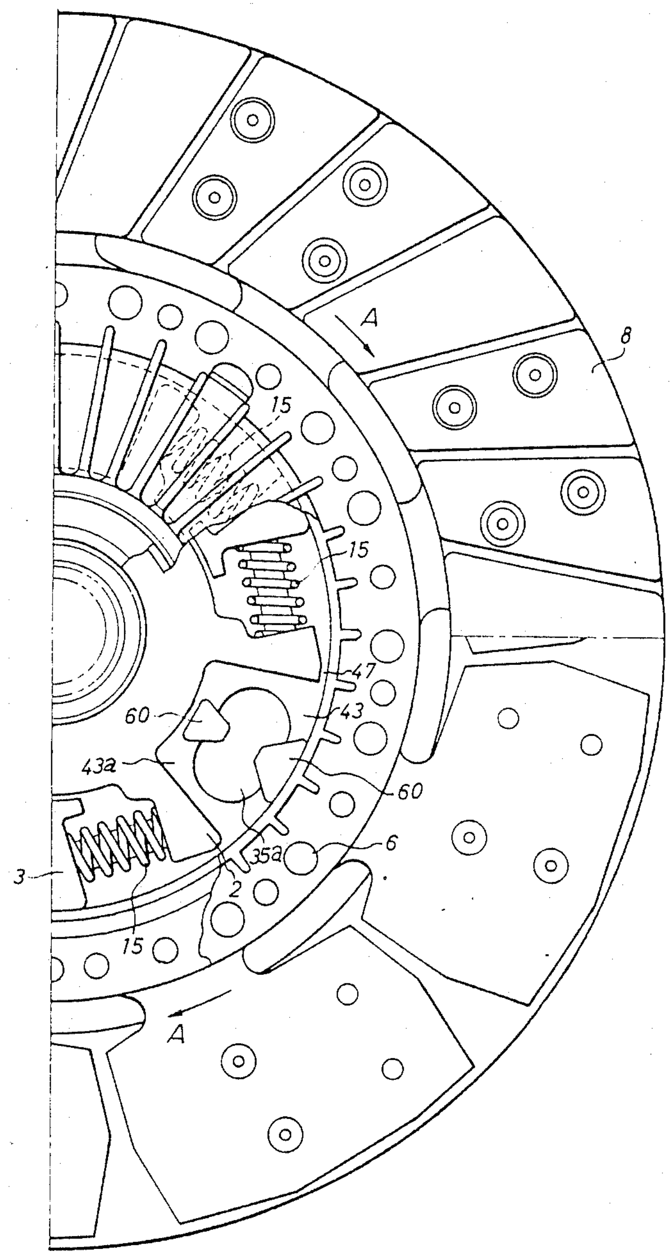
FIG. 6 is a partially cut-away elevation of a clutch disc of an other embodiment of the invention.

A modification shown in FIGS. 6 and 7 may also be employed. Referring to FIGS. 6 and 7, the structure shown are similar in some mechanisms to those in FIGS. 1-3 and 5, and thus the same members bear the same reference numbers. The following mechanisms are different.

A disc in FIG. 6 does not employ the cylinders 23 and 24 as well as pins 30, 31 and 32 in FIGS. 1-3, and is provided with cylinders 43*a* formed by recesses 43 extended to positions between adjacent springs 15. Pistons 35*a* made of bumpers such as rubber are arranged in the cylinders 43*a*, respectively. The pistons 35*a* are fixed to projections 60 (FIG. 7) of the case 3 or 4. The pistons 35*a* are operable to contact with inner surfaces of the cylinders 43*a* at the maximum torsion angle and function similarly as the stopper pins 40 in FIG. 3.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed is:

1. A damper disc comprising:

a spline hub;

a radial flange formed at the hub;

a sealed case having two halves covering the flange and having a radially outer portion to which a torque is transmitted;

torsion springs disposed in openings in the flange and axially faced hollws in the case for connecting the flange and the case together; and a piston cylinder mechanism disposed concentrically within the case and having a piston operable to move in accordance with relative torsion between the case and the flange, the case and a cylinder of the piston cylinder mechanism being filled with operating oil, and the cylinder being provided with only a narrow space through which the oil can be discharged and the cylinder being used exclusively as a hydraulic damper and having outer cylindrical walls separating said cylinder from said torsion springs, and said cylinder having an annular shape extending along a disc rotating direction and being arranged radially inside the torsion springs and between the case and the flange, an annular space in the cylinder is divided by partitions into several partially annular chambers in which the pistons are disposed respectively, the cylinder and partitions are fixed to one of the case and the flange, and the pistons in the cylinder are fixed to the other of the case and the flange.

2. A damper disc of claim 1 wherein the cylinder is fixed to the case, the partitions are formed by pins fixed to the case, and the pistons are formed by pins fixed to the flange.

3. A damper disc of either claim 1 or claim 2 wherein the radially outer portion of the case is connected to friction facings operable to be pressed to a flywheel of an engine.

4. A damper disc of claim 1, wherein said partitions are pins which fix said cylinder to said halves of said sealed case.

5. A damper disc of claim 4, wherein said partitions are closely fitted to the inner surface of the cylinder, thus causing said oil to flow out only from said narrow space during operation.

* * * * *